United States Patent [19]
Schürfeld et al.

[11] 4,206,665
[45] Jun. 10, 1980

[54] PRESETTABLE TOOL SUPPORTING DEVICE

[75] Inventors: Horst Schürfeld; Wolfgang Peters, both of Bielefeld, Fed. Rep. of Germany; Robert M. Ortlieb, Southfield, Mich.

[73] Assignee: DeVlieg Machine Company, Royal Oak, Mich.

[21] Appl. No.: 732,936

[22] Filed: Oct. 15, 1976

[51] Int. Cl.² .............................................. B23B 29/00
[52] U.S. Cl. .................................................... 82/36 R
[58] Field of Search .................. 82/36, 36 R, 37, 24 R

[56] References Cited

U.S. PATENT DOCUMENTS

| Re. 28,896 | 7/1976 | Gleason | 82/36 R |
|---|---|---|---|
| 117,513 | 8/1871 | Chormann | 82/36 R |
| 1,807,999 | 6/1931 | McMurtry | 83/36 R |
| 3,160,038 | 12/1964 | Wood | 82/24 R |
| 3,239,911 | 3/1966 | Williams | 29/105 A |
| 3,289,273 | 12/1966 | Artaud | 82/36 R |
| 3,575,072 | 4/1971 | Silver et al. | 82/36 R |
| 3,575,073 | 4/1971 | Zeller et al. | 82/36 R |
| 3,774,484 | 11/1973 | Douglas | 82/36 R |
| 3,982,452 | 9/1976 | Scheiffele | 82/36 R |

FOREIGN PATENT DOCUMENTS

| 245808 | 11/1960 | Australia | 82/36 R |
|---|---|---|---|
| 2330655 | 12/1974 | Fed. Rep. of Germany | 82/36 R |
| 25382 | of 1913 | United Kingdom | 82/36 R |
| 837592 | 6/1960 | United Kingdom | 82/36 R |
| 1086605 | 3/1966 | United Kingdom | 82/36 R |
| 1387082 | 3/1975 | United Kingdom | |

Primary Examiner—Harrison L. Hinson
Attorney, Agent, or Firm—Harness, Dickey & Pierce

[57] ABSTRACT

There is disclosed a presettable tool supporting device for machine tools which permits the tool to be preset in its tool holder away from the machine and then quickly and easily mounted on the machine in an accurately predetermined position, thus eliminating the need for adjusting the tool on the machine. The disclosed tool supporting device generally comprises a tool holder having means for affixing a tool thereto, a base member having attaching means for semi-permanently attaching the base member to a machine tool, locating means preferably in the form of complementary corrugated surfaces engageable with one another when the tool holder is placed in engagement with the base member to locate each with the other along two major axes while permitting relative movement between the two along a third major axis, stop means for locating the tool holder with respect to the base member in a predetermined position along the third axis, and releasable locking means for detachably locking the tool holder to the base member in said predetermined position. Several embodiments are disclosed, including one in which the locking means is accessible from the side and another in which access is from the top, and a further one in which locating and locking is accomplished on a second set of axes in addition to the first set. Alternative stop means and locking means are also disclosed.

25 Claims, 10 Drawing Figures

FIG. 1.

PRESETTABLE TOOL SUPPORTING DEVICE

BACKGROUND AND SUMMARY OF THE INVENTION

This invention relates to presettable tool holders for machine tools and particularly for turning tools and other machine tools in which the relative movement between the workpiece and tool is due primarily to movement of the workpiece and not the tool.

In all machine tools the cutting edge of the tool must be accurately oriented and positioned with respect to the workpiece prior to the initiation of a machining operation. In the past this was accomplished by mounting the tool on the machine and then adjusting same to achieve the desired spacial orientation and positioning. Each time a tool became worn or damaged it had to be either readjusted or replaced and adjusted. The resultant machinedown time was costly in terms of both time and money. As a consequence, the concept of presettable tools has evolved wherein the tool can be accurately prepositioned on a tool holder using a fixture or presetting machine separate from the machine tool, and when a tool change or adjustment is required the tool holder with the preset tool is simply mounted on the machine in an accurately predetermined location in lieu of the existing tool holder, which can then be preset for future use. Further adjustment of tool position and orientation is generally not required. Machine-down time and the costs attendant thereto have thereby been significantly reduced. The present invention is concerned with an improved tool holder and means for locating and mounting same on a machine tool, which is of the aforesaid presettable type.

It is a primary object of the present invention to provide an improved presettable tool supporting device for machine tools which is readily adapted for use on a large number of different types of machine tools, which is readily mountable on the existing tool supporting structure thereof with little or no modification, which may be quickly, easily and precisely mounted in position with repeatable high accuracy and without change of inadvertent disconnection, and which is quickly and easily removable from the machine tool.

It is another object of the present invention to provide an improved presettable tool supporting device having a tool holder and a base plate affixed to the machine, wherein the tool holder may be installed and removed from the base plate in more than one direction, for example, by moving it transversely away from or toward the base plate and machine or by sliding it generally parallel to the base plate and machine, thus increasing the usefulness of the device in machine tools having limited space and access. A related object resides in the provision of such a presettable tool supporting device for machine tools which in one embodiment has locking means actuatable from the side and in another embodiment from the top, thus further increasing the usefulness of the device. Another related object resides in the fact that these embodiments are interchangeable or combinable with one another at a given station on a machine tool.

A further object of the present invention is to provide an improved presettable tool supporting device for machine tools having a base plate affixed to the machine tool, a tool holder and locking means for releasably connecting the tool holder to the base plate, wherein the locking means forms part of the tool holder so that it is always located in an optimum position, and has optimum strength, for the particular tool being utilized, regardless of the position of the tool holder on the machine tool, wherein additional locking means may be provided if required, wherein the locking means provides a very strong positive clamping and yet is quickly engaged and released with a relatively small amount of effort, wherein the locking means is independent of the attachment of the tool to the tool holder, and wherein a single base plate can be arranged to support any desired number of tool holders.

Another object of the present invention resides in the provision of an improved presettable tool supporting device for machine tools wherein adjusting means is incorporated for positively making fine adjustments on the machine tool if required, wherein the device is of sufficient rigidity and strength to accomplish heavy duty machining, wherein a base plate is provided which may, if desired, by mounted to the existing T-slots or dovetail slots on the machine tool, and which is easy to maintain and clean because the portion thereof which remains on the machine during a tool change is rigid in construction and open-faced in configuration.

A further object of the present invention concerns the provision of an improved presettable tool supporting device for machine tools incorporating a tool holder and located means therefor having a wide range of adjustability. A related object concerns the provision of such a device having in one embodiment a stop element which is locked to the machine by a clamp operating in the same manner as, and having common elements with, the locking means for the tool holder.

Another object of the present invention is to provide an improved presettable tool supporting device for machine tools comprising a base plate affixed to the machine, a tool holder, and connecting and locating means therebetween including mating corrugated surfaces, the latter providing an increased area of engagement and a strong mechanical interlock, as well as locating accuracy and repeatability.

A further object of the present invention is to provide an improved presettable tool supporting device for machine tools comprising a base plate affixed to the machine, a first tool holder having side-actuated clamping means, a second tool holder having top-actuated clamping means which may be used in lieu of or in addition to the first tool holder, and clamp means in both tool holders adapted to clamp the latter to the same base plate, the clamp elements of each type tool holder being easily removable for inspection, repair and/or replacement, and being interchangeable with the clamp elements of other tool holders of the same type. A related object resides in the provision of such clamp elements of the side-actuated type which are also reversible so that clamping can be accomplished with either direction of actuation depending on the manner of assembly.

Another object of the present invention is to provide an improved presettable tool supporting device for machine tools which in one embodiment provides presettability with reference to a second set of axes.

These and other objects, features and advantages of the present invention will become apparent from the subsequent description and the appended claims, taken in conjunction with the accompanying drawings.

DETAILED DESCRIPTION

Figure 1:
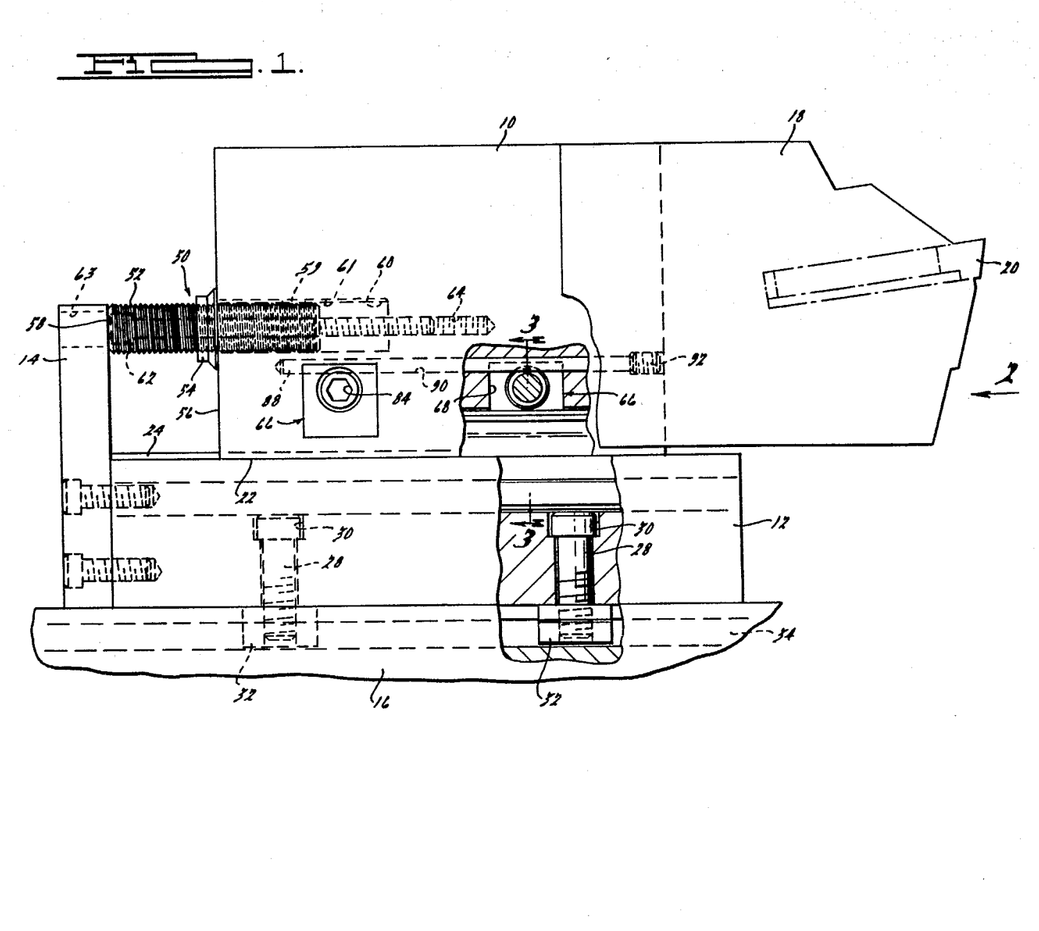
FIG. 1 is a side elevational view, partly in section, illustrating a tool supporting device embodying the principles of the present invention.
Figure 2:
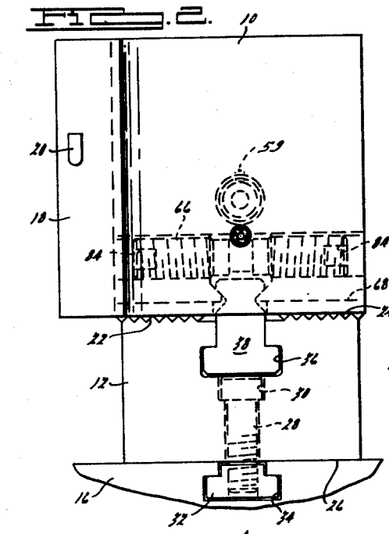
FIG. 2 is an end view looking in the direction of the arrow indicated at 2 in FIG. 1.
Figure 3:
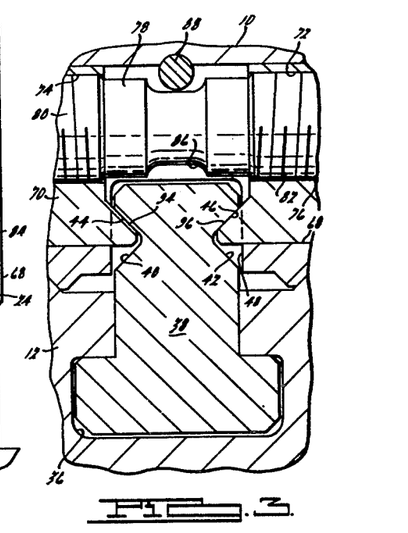
FIG. 3 is an enlarged fragmentary sectional view taken along line 3—3 in FIG. 1.
Figure 4:
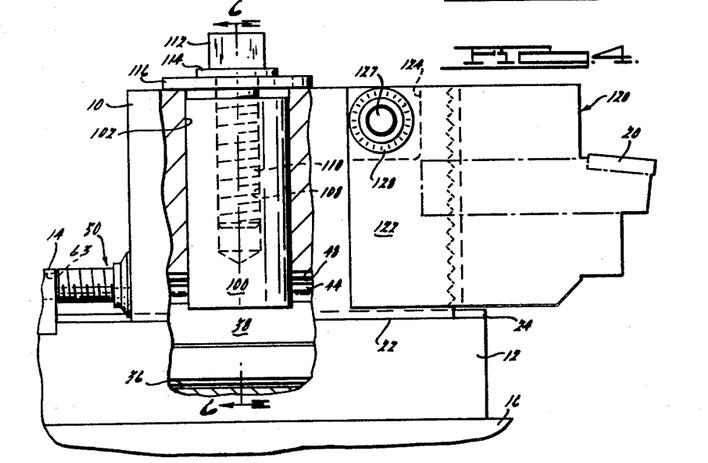
FIG. 4 is a side elevational view, partly in section, illustrating a second embodiment of a tool supporting device embodying the principles of the present invention.
Figure 5:
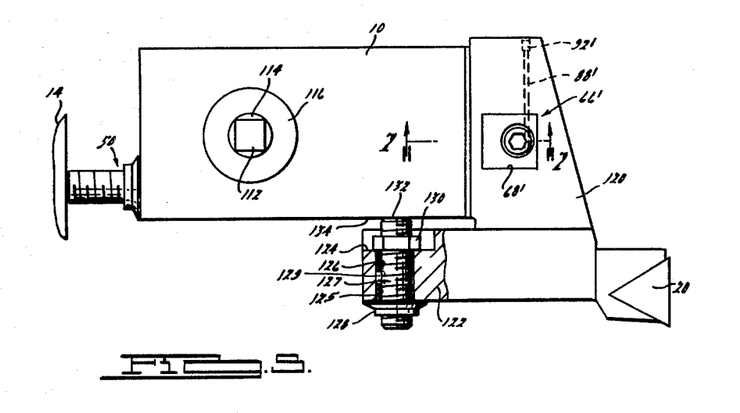
FIG. 5 is a top plan view of a portion of the tool supporting device illustrated in FIG. 4.

The tool supporting device of the present invention is suited for use on many different types of machine tools, particularly turning tools such as lathes, automatic screw machines, chucking machines and the like, and is adapted for mounting upon a turret, cross-slide, ram or other existing tool supporting structure of such a machine tool. Furthermore, the device is suited for supporting most all standard types of tools, such as cut-off tools, facing tools, knee turning tools, etc. For exemplary purposes, the present invention is illustrated in FIGS. 1 through 3 as embodied in a cut-off tool, whereas in FIGS 4 through 7 it is illustrated as embodied in a facing tool. It will be appreciated, however, that each embodiment is adapted for use with either type tool or with other type tools.

Referring more specifically to FIG. 1, the first embodiment of the invention comprises generally a tool holder 10 and a base plate 12 having located at one end thereof a stop element 14, the entire structure being affixed to the appropriate element of a machine tool, illustrated at 16. Stop element 14 may be secured to base plate 12 in any suitable manner, such as by machine screws, in conjunction with locating pins if desired. Tool holder 10 generally comprises a rectangular block of hardened steel having at the forward end thereof a tool mounting element 18 of conventional construction mounting in the usual manner an appropriate tool, such as cut-off tool 20. The details of construction of tool mounting element 18 are not a part of the present invention, nor is the manner in which it is connected in this embodiment to tool holder 10, any appropriate method of fastening being satisfactory.

The lower surface of tool holder 10 is provided with an accurately ground corrugated surface 22 comprising, in the embodiment illustrated, a plurality of parallel, equally spaced ridges and valleys of generally triangular cross section, preferably extending in a longitudinal direction. Surface 22 mates with an accurately ground complementary corrugated surface 24 disposed on the upper face of base plate 12. The corrugations of surfaces 22 and 24 are identical in configuration so that they will mate in the manner illustrated in FIG. 2, however it will be appreciated that they need not be of the exact cross-sectional configuration illustrated, and alternatively may be rounded or square or any other appropriate cross-sectional shape which will provide the desired functions; namely, limiting to a single axis relative movement between tool holder 10 and base plate 12, providing an increased surface area of contact, and establishing a mechanical interference preventing relative movement along axes at right angles to the aforesaid single axis, all with repeatability. In addition, the surface variations are relatively shallow, for economy of machining, and the resulting mating surfaces should not interlock with one another in a direction to prevent the members from being lifted apart. As can be seen with reference to FIG. 2, the corrugated mating surfaces prevent relative movement between tool holder 10 and base plate 12 both in a first vertical axis towards one another and in a second horizontal axis transversely of one another. Relative movement is permitted only in a longitudinal direction along a horizontal axis extending perpendicular to the plane of the drawing.

Base plate 12 is similarly formed from a generally rectangular block of hardened steel of approximately the same width as tool holder 10 and having a lower support surface 26 adapted to rest upon element 16 of the machine tool. Base plate 12 is essentially permanently or semi-permanently affixed to the machine tool by means of a plurality of machine screws 28 acting through suitable holes in the base plate from countersunk recesses 30 and conventional T-nuts 32 disposed in the standard longitudinally extending T-slot 34 generally provided on the machine tool. Alternatively, base plate 12 may be bolted directly to the machine tool.

The upper corrugated surface 24 of base plate 12 is provided with a longitudinally extending T-slot 36 in which is disposed a longitudinally extending retaining element 38 having a correspondingly shaped and sized T-shaped lower portion engageable with the sides of T-slot 36. Recesses 30 for machine screws 28 communicate with and are reached from the bottom of T-slot 36. The upper portion of retaining element 38 is generally rectangular in cross-sectional configuration and is provided on opposite sides thereof with inwardly directed longitudinally extending V-shaped grooves 40 and 42, respectively. Grooves 40 and 42 each have a downwardly and inwardly extending generally flat inclined surface, indicated at 44 and 46 respectively, extending longitudinally along the upper portion thereof.

Tool holder 10 is provided with a longitudinally extending generally rectangular slot 48 extending upwardly from surface 22 thereof in line with retaining element 38 when the tool holder and base plate are positioned in the desired relationship, suitable clearance being provided between the retaining element and the slot to permit relative longitudinal movement between the tool holder and base plate, as best shown in FIGS. 2 and 3.

Tool holder 10 is located along the third or longitudinal horizontal axis by the coaction between the stop element 14 and a stop member 50 on tool holder 10. Although stop member 50 can be a rigid non-adjustable member if desired, it is illustrated for exemplary purposes in this embodiment as comprising an adjusting screw 52 threadably engaging an adjusting collar 54 which abuts the end face 56 of tool holder 10. Stop screw 52 is provided on its free end with a stop surface 58, the axial position of which with respect to tool holder 10 is determined by the position on stop screw 52 to which adjusting collar 54 has been screwed, a bore 60 being provided in end 56 of tool holder 10 to slidably receive, in a slip fit, the inner end of stop screw 52. A key 59 is provided on screw 52 which coacts with a key slot 61 in bore 60 to prevent relative rotation therebetween and facilitate adjustment. Once the screw and collar have been adjusted to the proper position, they are maintained fixed in that position by means of a machine screw 62 operating between a countersunk recess in the end of the stop screw and a threaded bore 64 within tool holder 10, as best illustrated in FIG. 1. Access to screw 62 is provided by an aperture 63 in stop element 14. Stop surface 58 of stop screw 52 engages stop element 14 to properly locate the tool holder in an accurately predetermined position with respect to base plate 12.

The tool holder and base plate are locked together, once accurately positioned with respect to one another, by means of locking means generally indicated at 66. Although two such locking means are illustrated, the number used is optional depending on the locking strength required in a particular application, and any desired number may be used. Furthermore, each locking means 66 is of the same construction, and are interchangeable with one another, so that only one will be described herein for illustrative purposes, i.e., the right-hand one as shown in FIG. 1.

Generally speaking, locking means 66 comprises a transversely extending generally rectangular bore 68 formed through tool holder 10 in a position intersecting the top of retaining element 38 and slot 48. Slidably disposed within bore 68 is a first gripping element 70 disposed on one side of retaining element 38 and on the opposite side thereof a second gripping element 72. Gripping elements 70 and 72 are of a cross-sectional configuration substantially the same as that of bore 68 and are transversely slidable but not rotatable with respect thereto. Gripping element 70 is provided with a transversely extending threaded through-bore 74 having threads of a given hand and gripping element 72 is provided with a transversely extending through-bore 76 having threads of the opposite hand, bores 74 and 76 being coaxial with one another. Disposed within bores 74 and 76 is a locking screw 78 having at one end a threaded portion 80 the threads of which correspond in hand to those of bore 74, and at the opposite end a threaded portion 82 having threads of the same hand as those of bore 76. Each end of locking screw 78 is provided with a wrench receiving socket 84 so that a wrench may be used to rotate the locking screw. Alternatively, socket 84 may be replaced with a square or hex-shaped projection, or can have a socket at one end and a projection at the opposite end, whatever is desired. The central portion of locking screw 76 is unthreaded and is provided with an annular groove 86 which cooperates with a longitudinally extending pin 88 to prevent the locking screw and gripping element assembly from inadvertently sliding out of bore 68 when the tool holder is disassembled from the base plate. Pin 88 is disposed within a hole 90 extending longitudinally through the tool holder from the front face thereof, and is retained in place by means of a threaded set screw 92, as best illustrated in FIG. 1. As can be seen, pin 88 is of sufficient length to retain the locking screws of both locking means 66 provided on the tool holder of this embodiment. On the other hand separate pins may be used if desired.

The inner end of gripping element 70 is provided with a longitudinally extending inclined generally flat gripping surface 94 complementary with and adapted to engage the surface 44 on retaining element 38. Gripping element 72 is similarly provided with a longitudinally extending inclined generally flat gripping surface 96 complementary with and adapted to engage surface 46 on retaining element 38. As can be best seen in FIGS. 2 and 3, rotation of locking screw 78 by means of a suitable wrench operating in one of the sockets 84 will cause the gripping elements to either move toward or away from one another. When locking screw 78 is rotated in such a direction as to cause the gripping elements to move toward one another they will do so until the gripping surfaces thereof firmly engage the complementary surfaces on retaining element 38, to rigidly lock the tool holder tightly against the base plate by the camming action of the respective surfaces, which causes the two members to be pulled tightly together. Opposite rotational actuation of locking screw 78 causes the gripping elements to separate and unlock the two members, thus permitting longitudinal relative movement therebetween. The use of threads of opposite hand opposing one another increases the speed of actuation of the gripping elements by locking screw 78. Groove 86 is wider than pin 88 so that screw 78 floats sufficiently to assure good clamping engagement and to provide interchangeability of parts. The clamping elements may be easily removed merely by removing pin 88 and sliding them out of bore 68. Reversal of screw 78, end to end, in bore 68 will reverse the direction of actuation of screw 78 required for locking.

The tool holder can be removed from the base plate either by sliding the tool holder longitudinally off the base plate or by opening up the gripping elements far enough that the tool holder may be lifted upwardly away from the base plate, whichever is desired. The embodiment of FIGS. 1 through 3 has locking means 66 which are most accessible from the sides of the device, and therefore is particularly useful on machine tools where side access is present.

Use of the tool supporting device of the present invention is extremely simple. Whenever it becomes necessary to replace a tool, due to wear, breakage, etc., all that is required is that locking means 66 be loosened and the tool holder either slid off of or lifted from base plate 12, whereupon a second tool holder having a new preset tool thereon can be immediately interchanged by merely sliding or placing it on the base plate, sliding it longitudinally until stop surface 58 engages stop element 14, and thereafter tightening the locking means.

The tool that is removed, as well as the one that was previously off the machine, are preset for subsequent machine use by placing them in a suitable fixture or presetting machine which has the same reference or planes as are defined by the corrugated surface of the base plate and the abutting surface of the stop element. The corrugated surface locates the tool holder along two axes or in two dimensions and the stop element locates it in the third. With a fresh tool inserted in the tool holder the stop member 50 thereof is adjusted in the fixture or tool presetting machine until the cutting edge of the tool is at a precise spacial point and orientation with respect to the three reference planes, this being determined in advance for any given machining operation and the machine tool in question in accordance with known criteria.

When a tool holder thus preset is thereafter locked to the base plate on the machine tool in the aforedescribed manner, the cutting edge of the tool will always be in the proper spacial position with respect to the machine tool to immediately commence machining, thus eliminating the need for adjustments of the tool on the machine and the machine-down time occasioned thereby. If, however, fine adjustments are required to be made on the machine tool, such can be easily accomplished in the longitudinal direction by adjusting stop member 50. The appropriate locking means should be loosened prior to such fine adjustments, after which the locking means can be retightened. As used throughout this specification, the term "longitudinal" has reference to the tool supporting device and not necessarily the machine tool on which it is mounted.

The embodiment of FIGS. 4 through 7 differs from the preceding one in that a facing tool is disclosed, and more significantly in that it embodies a locking means which is accessible from the top of the device, thus making it suitable for machine tool environments in which access to the top of the tool supporting device is greater than to the sides thereof. Furthermore, in this embodiment there is illustrated an auxiliary locating and locking means between the tool holder and the tool itself to provide a second stage of tooling presettability with reference to a second set of axes. In describing the second embodiment the same reference numerals have been used to designate parts which are substantially the same if not identical to corresponding parts in the first embodiment. Obviously, the shapes and dimensions of many of the respective parts can be varied, with a wide degree of latitude, depending on the particular application at hand.

Insofar as positioning of the tool supporting device in the longitudinal direction is concerned, most of the structure is substantially the same as that utilized in the first embodiment, with the exception being in the details of construction of the holding means incorporated in tool holder 10 for clamping retaining element 38 to lock the members together. In this embodiment, the holding means comprises a gripping element 100 which is generally cylindrical in configuration and is slidingly disposed for vertical movement in a bore 102 in tool holder 10. The lower end of gripping element 100 is provided with a longitudinally extending slot of the configuration best shown in FIG. 6, having a pair of generally flat inclined surfaces 104 and 106 which are complementary to and slidingly engage surfaces 44 and 46 on retaining element 38. Gripping element 100 is also provided with a vertically extending threaded bore 108 in which is threadably disposed a locking screw 110 having at the upper end thereof a wrench engaging portion 112 and a flange 114. Disposed between flange 114 and tool holder 10 is a washer 116 which is larger than the diameter of bore 102.

Figure 6:
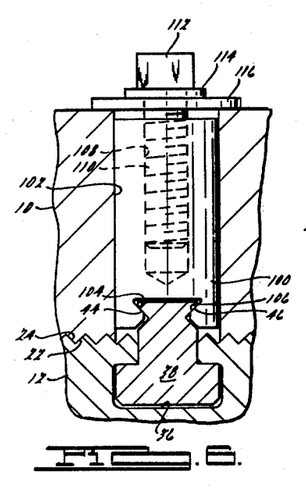
FIG. 6 is an enlarged fragmentary sectional view taken along line 6—6 in FIG. 4.
Figure 7:
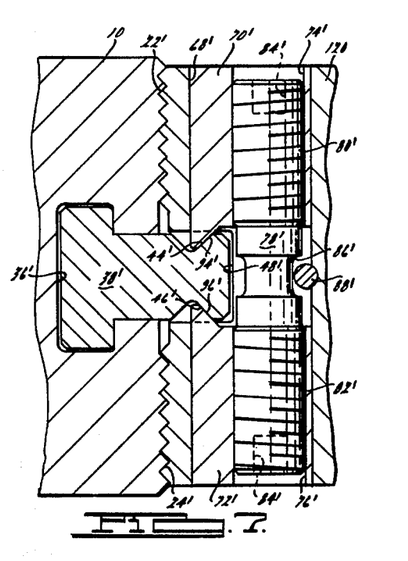
FIG. 7 is an enlarged fragmentary sectional view taken along line 7—7 in FIG. 5.

Thus, as best shown in FIG. 6, rotation of locking screw 110 in a direction to cause gripping element 100 to be pulled upwardly will cause tool holder 10 to be urged into tight locking engagement with base plate 12. Gripping element 100 should be dimensioned so that there is sufficient clearance above it to permit it to move upwardly a sufficient distance to accomplish the desired locking function. Sufficient clearance is also provided between the gripping surfaces on gripping element 100 and retaining element 38 that reverse actuation of locking screw 110 will permit the gripping element to be loosely slidable on the retaining element, and the tool holder this slidable on the base plate. Removal of the tool holder from the base plate is accomplished merely by sliding it longitudinally until the gripping element clears the retaining element. The tool holder may be lifted vertically from the base plate by removing screw 110 or by using a C-washer for washer 116 and merely removing the washer. Only a single gripping element is shown, for exemplary purposes, however any number may be provided, depending upon the strength required. It should also be noted that the tool holder of the second embodiment is fully interchangeable with the tool holder of the first embodiment, even though they utilize different locking means.

The embodiment of FIGS. 4 through 7 is also provided with means whereby presettability may be obtained between the tool itself and the tool holder, along a different set of axes. This is achieved by providing a tool mounting element 120 between tool 20 and tool holder 10, and using a connecting arrangement between tool mounting element 120 and tool holder 10 which is identical to that utilized between tool holder 10 and base plate 20 in the first embodiment. Because the connecting arrangements are identical, including the use of corrugated surfaces, screw actuated locking means, and the like, the same reference numerals are used except that they have been primed, and the discussion with respect to the previous connecting arrangement is fully applicable. The corrugations are shown for illustrative purposes running horizontally, however they could be disposed vertically if desired for adjustment in that direction.

Tool mounting element 120 is also provided with a rearwardly projecting element 122 having on the inner face thereof a recess 124 and a transversely aligned bore 126 extending from the recess to the outer face of the element and having a keyway 125. Slidably disposed within bore 126 is a threaded stop screw 127 having on the outside end thereof a threaded adjusting collar 128, a centrally disposed key 129, and on the inner end thereof a threaded lock nut 130, the inner end of stop screw 127 having a stop surface 132 adapted to abuttingly engage the side surface 134 of tool holder 10. The structure thus defined performs the exact same function as stop member 50 in the first embodiment. Collar 128 is rotated to a position such that when it is engaging element 122 stop surface 132 is in a position which will properly locate tool mounting element 120 with respect to tool holder 10, whereupon lock nut 130 is tightened to fix the relationship.

In this embodiment the tool may be quickly and easily removed from the tool holder by releasing locking means 66' and either sliding or lifting the tool mounting element away from the tool holder. The desired relationship between the tool and the tool holder may thereafter be established by manipulation of stop screw 127 in a suitable fixture or presetting machine, using corrugated surface 22' and stop surface 132 as the reference points. Thereafter the tool mounting element may be quickly reassembled to the tool holder and accurately positioned with respect thereto by placing the corrugated surfaces in mating engagement and sliding the mounting element until stop surface 132 engages the side of the tool holder, whereupon locking means 66' may be actuated to tightly clamp the two members together.

It will be appreciated that in lieu of the locking means 66' utilized on tool mounting element 120, if desired a locking means of the type utilized in the second embodiment between tool holder 10 and base plate 12 may alternatively be used, depending upon the application in question. Also, if desired, final adjustments can be made on the machine by loosening the appropriate locking means and adjusting stop member 50 or adjusting screw 126, as the case may be, and thereafter tightening the appropriate locking means.

Figure 8:
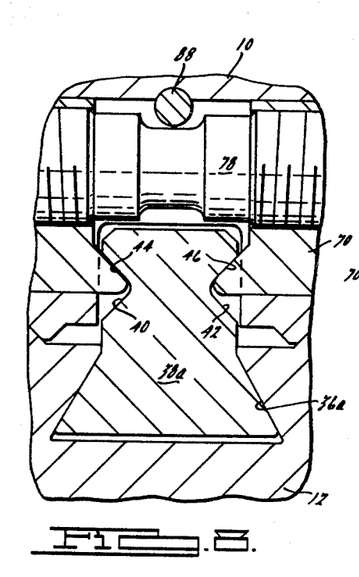
FIGS. 8 and 9 show alternative retaining element designs for use in any one of the preceding embodiments.

In FIG. 8 there is illustrated an alternative way of constructing retaining element 38. In FIG. 8 the retaining element, indicated at 38a, is illustrated as being of standard dovetail configuration for disposition in, and slidable engagement with, a standard dovetail slot 36a. The advantage of the dovetail arrangement over the T-slot arrangement shown in the preceding embodiments is that the dovetail requires less vertical space (i.e., a standard dovetail slot has less depth than a standard T-slot) and in that is permits convenient use of the invention on machine tools already having dovetail slots. Also, dovetails do not have the stress points present on a T-shaped element at the inside corners thereof.

Figure 9:
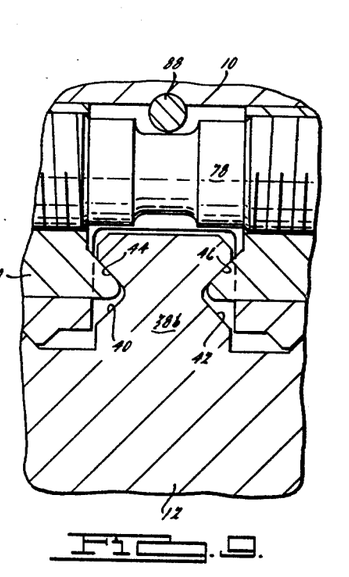

In FIG. 9 the retaining element, indicated at 38b, is formed integrally with base plate 12. This arrangement is stronger and more suited for heavy-duty machining than either of the preceding modes of forming the retaining element. As will be appreciated, any one of the three disclosed alternative ways of forming the retaining element may be used, depending upon the application, and each is fully applicable both to the locking means provided between the tool holder and base plate, as well as to that provided between the tool mounting element and tool holder. In all embodiments, retaining element 38 (or 38a or 38b) is of whatever length is required to accommodate the one or more tool holders associated therewith.

Figure 10:
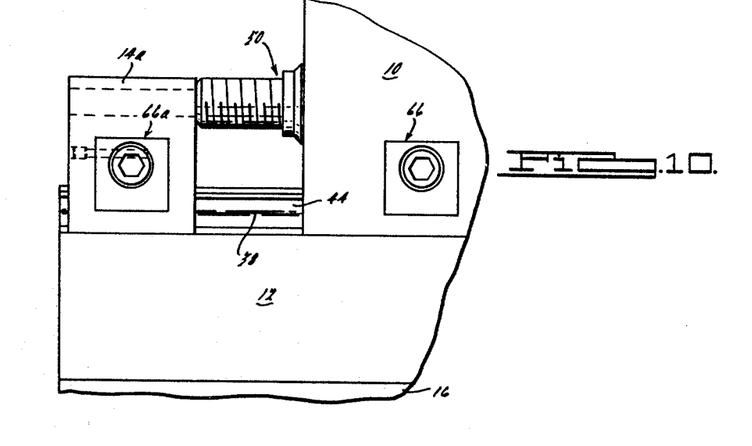
FIG. 10 is a partial side elevational view similar to FIG. 1 but illustrating an alternative construction for a stop means.

The embodiment illustrated in FIG. 10 is identical to that illustrated in FIGS. 1 through 3, except that retaining element 38 has been made longer so that it extends beyond tool holder 10 (all the way to the end of base plate 12 as shown), and is used for retention of the stop element, indicated at 14a. As can be seen, stop element 14a is fixed to the base plate by a locking means 66a which is identical to that used for the tool holder in the first embodiment. This arrangement gives a greater range of adjustability because not only is the adjustability of stop member 50 available, but in addition a substantial range of adjustment of stop element 14a is also available.

Another possible variation to increase the range of adjustability would be to widen T-slot 34 so that a transverse adjustment of at least one groove on surfaces 22 and 24 is possible. Like modifications will suggest themselves to those skilled in the art.

Thus, there is disclosed in the above description and in the drawings an improved tool supporting device which fully and effectively accomplishes the objectives thereof. However, it will be apparent that variations and modifications of the disclosed embodiments may be made without departing from the principles of the invention or the scope of the appended claims.

We claim:

1. A tool supporting device for machine tools, comprising: a tool holder having means for affixing a tool thereto; a base member having attaching means for attaching said base member to a machine tool; a retaining element connected to said base member, said retaining element having opposed longitudinally extending surfaces thereon; a pair of gripping elements on said tool holder and arranged to straddle said retaining element and clampingly engage said opposed surfaces; and actuating means for forcing said gripping elements against said opposed surfaces to lock said tool holder to said base member, said actuating means including an actuating screw one end of which threadably engages one of said gripping elements with threads of one hand and the other end of which threadably engages the other of said gripping elements with threads of the opposite hand.

2. A tool supporting device as claimed in claim 1, wherein said gripping elements are slidably and non-rotatively disposed in a transversely extending bore in said tool holder.

3. A tool supporting device as claimed in claim 2, wherein said bore and said gripping elements are non-circular in configuration.

4. A tool supporting device as claimed in claim 1, wherein said retaining element is elongated in the longitudinal direction and said tool holder and gripping elements are longitudinally movable with respect thereto.

5. A tool supporting device as claimed in claim 1 wherein said screw is provided with an annular circumferential groove on the outside thereof disposed between said threaded ends and further comprising pin means supported by said tool holder and passing through a portion of said groove to prevent excessive transverse movement of said screw and gripping elements.

6. A tool supporting device as claimed in claim 5, wherein said groove is wider than the diameter of said pin means so that said screw and gripping elements are free to float transversely to a limited extent.

7. A tool supporting device as claimed in claim 1, wherein said actuating means forces said gripping elements against said opposed longitudinally extending surfaces to cam said tool holder into locking engagement with said base member.

8. A tool supporting device for machine tools, comprising a tool holder having means for affixing a tool thereto; a base member having attaching means for attaching said base member to a machine tool; one of said tool holder and base member having a longitudinally extending retaining element connected thereto, having on opposite sides thereof a longitudinally extending surface; the other of said tool holder and base member having holding means connected thereto, said holding means having holding surfaces disposed on both sides of said longitudinally extending retaining element and being movable with respect to said other of said tool holder and base member to engage said longitudinally extending surfaces; said holding surfaces being disposed on the same rigid member so that they do not move with respect to one another; and actuating means for moving said holding surfaces to force same against said longitudinally extending surfaces to lock said tool holder to said base member.

9. A tool supporting device for machine tools, comprising a tool holder having means for affixing a tool thereto; a base member having attaching means for attaching said base member to a machine tool; one of said tool holder and base member having a longitudinally extending retaining element connected thereto, having on opposite sides thereof a longitudinally extending surface; the other of said tool holder and base member having a transverse bore of non-circular cross section; holding means disposed in said bore and having a complementary non-circular cross section, said holding means having holding surfaces disposed on both sides of said longitudinally extending retaining element and being movable within said bore to engage said longitudinally extending surfaces; and threaded actuating means for moving said holding surfaces to force same against said longitudinally extending surfaces to lock said tool holder to said base member.

10. A tool supporting device as claimed in claim 9, wherein said threaded actuating means comprises a single screw with threads of one hand actuating said holding means on one side of said surfaces and threads of the opposite hand actuating said holding means on the other side of said surfaces.

11. A tool supporting device for machine tools comprising: a tool holder having means for affixing a tool thereto; a base member having attaching means for attaching said base member to a machine tool; a longitudinally extending retaining element on said base member, said retaining element having on opposite sides thereof a longitudinally extending surface; holding means connected to said tool holder and having holding surfaces disposed on both sides of said longitudinally extending retaining element and movable with respect to said tool holder to engage said longitudinally extending surfaces; and actuating means for moving said holding surfaces to force same against said longitudinally extending surfaces to lock said tool holder to said base member.

12. A tool supporting device as claimed in claim 11, wherein said actuating means includes a manually adjustable rotational element having an axis of rotation generally perpendicular to said retaining element.

13. A tool supporting device as claimed in claim 11, wherein said tool supporting device further comprises stop means for locating said tool holder with respect to said base member in a predetermined position along the axis of said retaining element, said stop means being connected to said base member by means identical to said locking means.

14. A tool supporting device as claimed in claim 11, further comprising presettable connecting means for affixing the tool to said holder.

15. A tool supporting device as claimed in claim 11, wherein said holding surfaces are disposed on the same rigid member so that they do not move with respect to one another.

16. A tool supporting device as claimed in claim 11, wherein said retaining element is disposed within a dovetail slot in said base member.

17. A tool supporting device as claimed in claim 11, wherein said retaining element is integral with said base member.

18. A tool supporting device as claimed in claim 11, wherein said tool holder has plural holding means.

19. A tool supporting device for machine tools, comprising: a tool holder having means for affixing a tool thereto and provided with a longitudinally extending groove; a base member having attaching means for attaching said base member to a machine tool; a longitudinally extending retaining element having on opposite sides thereof a longitudinally extending surface; holding means slidably mounted within a bore extending transversely through said tool holder and intersecting said groove, said groove adapted to receive said retaining element when said tool holder and base member are locked together, said holding means having holding surfaces arranged to engage said longitudinally extending surfaces; and actuating means for forcing said holding surfaces against said longitudinally extending surfaces to lock said tool holder to said base member.

20. A tool supporting device for machine tools, comprising a tool holder; a base member having attaching means for attaching said base member to a machine tool; first locating means operable when said tool holder is placed in engagement with said base member to locate each with the other along two axes but permitting relative movement between the two along a third axis; first stop means for locating said tool holder with respect to said base member in a predetermined position along said third axis; first locking means for detachably locking said tool holder to said base member in said predetermined position; a tool mount having means for affixing a tool thereto; second locating means operable when said tool mount is placed in engagement with said tool holder to locate each with the other along two axes but permitting relative movement between the two along a third axis; second stop means for locating said tool mount with respect to said tool holder in a predetermined position along said last-mentioned third axis; and second locking means for detachably locking said tool holder to said tool mount in said last-mentioned predetermined position.

21. A tool supporting device as claimed in claim 20, wherein said first locating means includes a corrugated surface on said tool holder and a corrugated surface on said base member, said surfaces being complementary to and mating with each other.

22. A tool supporting device as claimed in claim 20, wherein said second locating means includes a corrugated surface on said tool holder and a corrugated surface on said tool mount, said surfaces being complementary to and mating with each other.

23. A tool supporting device for machine tools, comprising: a tool holder having means for affixing a tool thereto; a base member having attaching means for attaching said base member to a machine tool; a longitudinally extending retaining element connected to said base member, said retaining element having on opposite sides thereof a longitudinally extending surface; holding means connected to said tool holder and having holding surfaces disposed on separate elements movable toward and away from one another to clampingly engage and disengage said retaining element; and actuating means for forcing said holding surfaces against said longitudinally extending surfaces to lock said tool holder to said base member.

24. A tool supporting device for machine tools, comprising: a tool holder having means for affixing a tool thereto; a base member having attaching means for attaching said base member to a machine tool; a longitudinally extending retaining element, disposed within a T-slot in said base member and connected to said base member, said retaining element having on opposite sides thereof a longitudinally extending surface; holding means connected to said tool holder and having holding surfaces arranged to engage said longitudinally extending surfaces; and actuating means for forcing said holding surfaces against said longitudinally extending surfaces to lock said tool holder to said base member.

25. A tool supporting device for machine tools, comprising a tool holder having means for affixing a tool thereto; a base member having attaching means for attaching said base member to a machine tool; one of said tool holder and base member having a longitudinally extending retaining element connected thereto, having on opposite sides thereof a longitudinally extending surface; the other of said tool holder and base member having a transverse bore; holding means disposed in said bore and having a complimentary cross-section, said holding means having holding surfaces disposed on both sides of said longitudinally extending retaining element and being movable with respect to said other of said tool holder and base member to engage said longitudinally extending surfaces; and actuating means for moving said holding surfaces to force same against said longitudinally extending surfaces to lock said tool holder to said base member.

* * * * *

UNITED STATES PATENT AND TRADEMARK OFFICE
CERTIFICATE OF CORRECTION

PATENT NO. : 4,206,665
DATED : June 10, 1980
INVENTOR(S) : Horst Schurfeld, Wolfgang Peters and Robert M. Ortlieb It is certified that error appears in the above-identified patent and that said Letters Patent are hereby corrected as shown below:

Column 1, line 42: "change" should be --chance--

Column 2, line 20: "by" should be --be--

Column 2, line 28: "located" should be --locating--

Column 5, line 57: "76" should be --78--

Column 6, line 58: after "reference" insert -- points --.

Column 8, line 3: "this" should be --thus--

Signed and Sealed this

Twenty-sixth Day of August 1980

[SEAL]

Attest:

SIDNEY A. DIAMOND

Attesting Officer

Commissioner of Patents and Trademarks